US005852073A

United States Patent [19]
Villiger et al.

[11] Patent Number: 5,852,073
[45] Date of Patent: *Dec. 22, 1998

[54] ERASABLE INK COMPOSITION CONTAINING A POLYMER-ENCAPSULATED COLORANT OBTAINED BY POLYMERIZING MONOMER IN THE PRESENCE OF SOLID COLORANT PARTICLES

[75] Inventors: David C. Villiger, Greenville; Aiying Wang, Simpsonville; Jeffery H. Banning, Spartanburg; Wayne A. Chandler, Mauldin; Barry W. Chadwick, Simpsonville, all of S.C.

[73] Assignee: Bic Corporation, Milford, Conn.

[ * ] Notice: The term of this patent shall not extend beyond the expiration date of Pat. No. 5,661,197.

[21] Appl. No.: 650,596

[22] Filed: May 20, 1996

Related U.S. Application Data

[63] Continuation of Ser. No. 360,415, Dec. 21, 1994, abandoned.

[51] Int. Cl.$^6$ .................................................. C09D 11/18
[52] U.S. Cl. ....................... 523/161; 523/200; 523/205; 524/458; 524/460; 260/DIG. 38; 106/31.32; 106/31.45; 401/209
[58] Field of Search ..................... 523/161, 200, 523/205; 524/458, 460; 106/21 A, 22 R, 23 R, 22 B; 260/DIG. 38; 401/209

[56] References Cited

U.S. PATENT DOCUMENTS

| | | | |
|---|---|---|---|
| 3,383,346 | 5/1968 | Smith | 524/745 |
| 3,544,500 | 12/1970 | Osmond et al. | 428/402.24 |
| 3,875,105 | 4/1975 | Daugherty et al. | 523/161 |
| 3,884,871 | 5/1975 | Herman et al. | 523/202 |
| 3,904,562 | 9/1975 | Hopfenberg et al. | 523/200 |
| 3,935,340 | 1/1976 | Yamaguchi et al. | 427/216 |
| 3,949,132 | 4/1976 | Seregely et al. | 428/207 |
| 3,965,032 | 6/1976 | Gibbs et al. | 252/306 |
| 4,048,136 | 9/1977 | Kobayashi et al. | 524/439 |
| 4,059,554 | 11/1977 | Pacansky | 524/486 |
| 4,097,290 | 6/1978 | Muller et al. | 106/30 R |
| 4,137,083 | 1/1979 | Hedrick | 106/20 R |
| 4,194,920 | 3/1980 | Burke, Jr. | 523/200 |
| 4,212,676 | 7/1980 | Ueda | 106/19 B |
| 4,227,930 | 10/1980 | Lin | 106/19 A |
| 4,256,494 | 3/1981 | Yamamoto et al. | 106/22 A |
| 4,264,700 | 4/1981 | Bayley | 430/137 |
| 4,329,262 | 5/1982 | Muller | 523/161 |
| 4,329,264 | 5/1982 | Muller | 523/161 |
| 4,349,639 | 9/1982 | Muller | 523/161 |
| 4,357,431 | 11/1982 | Murakami et al. | 523/161 |
| 4,367,966 | 1/1983 | Williams et al. | 401/190 |
| 4,368,076 | 1/1983 | Iijima | 106/22 F |
| 4,379,867 | 4/1983 | Noriaki | 523/161 |
| 4,389,499 | 6/1983 | Riesgraf | 523/161 |
| 4,390,646 | 6/1983 | Ferguson | 523/161 |
| 4,391,927 | 7/1983 | Farmer, III | 523/161 |
| 4,407,985 | 10/1983 | Muller | 523/161 |
| 4,410,643 | 10/1983 | Muller | 523/161 |
| 4,419,464 | 12/1983 | Williams et al. | 523/161 |
| 4,421,660 | 12/1983 | Solc nee Hajna | 252/62.54 |
| 4,441,928 | 4/1984 | Iijima | 106/21 A |
| 4,471,079 | 9/1984 | Enami | 523/161 |
| 4,509,982 | 4/1985 | Iijima | 106/23 B |
| 4,524,199 | 6/1985 | Lok et al. | 527/313 |
| 4,525,216 | 6/1985 | Nakanishi | 106/30 B |
| 4,532,276 | 7/1985 | Knäble et al. | 524/18 |
| 4,545,818 | 10/1985 | Inoue et al. | 106/22 F |
| 4,557,618 | 12/1985 | Iwata et al. | 401/34 |
| 4,578,117 | 3/1986 | Nakanishi | 106/20 A |
| 4,596,846 | 6/1986 | Bohne et al. | 524/173 |
| 4,606,769 | 8/1986 | Tanaka et al. | 106/30 R |
| 4,629,748 | 12/1986 | Miyajima et al. | 523/161 |
| 4,652,508 | 3/1987 | Ober et al. | 430/109 |
| 4,665,107 | 5/1987 | Micale | 523/105 |
| 4,671,691 | 6/1987 | Case et al. | 401/142 |
| 4,680,200 | 7/1987 | Solc | 427/213.34 |
| 4,686,246 | 8/1987 | Gajria | 523/161 |
| 4,687,791 | 8/1987 | Miyajima et al. | 523/161 |
| 4,692,188 | 9/1987 | Ober et al. | 106/23 R |
| 4,693,846 | 9/1987 | Piccirilli et al. | 106/29 R |
| 4,721,739 | 1/1988 | Brenneman et al. | 523/161 |
| 4,726,845 | 2/1988 | Thompson et al. | 106/25 A |
| 4,738,725 | 4/1988 | Daugherty et al. | 106/32 |
| 4,760,104 | 7/1988 | Miyajima et al. | 523/161 |
| 4,770,706 | 9/1988 | Pietsch | 106/24 R |
| 4,786,198 | 11/1988 | Zgambo | 401/142 |
| 4,789,399 | 12/1988 | Williams et al. | 106/20 R |
| 4,830,670 | 5/1989 | Danyu | 106/23 B |
| 4,874,832 | 10/1989 | Jabs et al. | 528/60 |
| 4,889,877 | 12/1989 | Seitz | 523/161 |
| 4,936,916 | 6/1990 | Shinmitsu et al. | 106/21 E |
| 4,940,628 | 7/1990 | Lin et al. | 428/209 |
| 4,940,738 | 7/1990 | Seitz | 523/161 |
| 4,942,185 | 7/1990 | Inoue et al. | 521/54 |
| 4,954,174 | 9/1990 | Imagawa | 106/27 R |
| 4,960,464 | 10/1990 | Chen | 106/19 D |
| 4,971,628 | 11/1990 | Loftin | 106/22 F |
| 4,985,484 | 1/1991 | Yoshida et al. | 524/379 |
| 5,004,763 | 4/1991 | Imagawa | 523/161 |
| 5,004,963 | 4/1991 | Imagawa | 523/161 |
| 5,009,536 | 4/1991 | Inoue et al. | 401/198 |
| 5,010,125 | 4/1991 | Kruse et al. | 524/308 |
| 5,013,361 | 5/1991 | Case et al. | 106/22 F |
| 5,017,225 | 5/1991 | Nakanishi et al. | 106/21 A |

(List continued on next page.)

FOREIGN PATENT DOCUMENTS

| | | |
|---|---|---|
| 0054832 | 6/1982 | European Pat. Off. . |
| 0209879 | 1/1987 | European Pat. Off. . |
| 0556668 | 8/1993 | European Pat. Off. . |
| 1-289881 | 11/1989 | Japan . |
| WO8301625 | 5/1983 | WIPO . |
| WO9312175 | 6/1993 | WIPO . |
| WO9324565 | 12/1993 | WIPO . |

*Primary Examiner*—Marion E. McCamish
*Assistant Examiner*—John J. Guarriello
*Attorney, Agent, or Firm*—Pennie & Edmonds LLP

[57] ABSTRACT

An erasable ink composition contains a dispersion of solid particles of water-insoluble polymer-encapsulated colorant obtained from the emulsion polymerization of at least one emulsion-polymerizable monomer in the presence of solid colorant particles. The ink is intended for use in any of a variety of marking instruments, in particular, a ball-point pen.

18 Claims, No Drawings

U.S. PATENT DOCUMENTS

| | | | |
|---|---|---|---|
| 5,024,700 | 6/1991 | Britton, Jr. | 106/32 |
| 5,024,898 | 6/1991 | Pitts et al. | 428/511 |
| 5,037,702 | 8/1991 | Pitts et al. | 428/423.7 |
| 5,048,992 | 9/1991 | Loftin | 401/209 |
| 5,082,495 | 1/1992 | Iijima | 106/21 A |
| 5,102,856 | 4/1992 | Doll et al. | 503/209 |
| 5,106,881 | 4/1992 | Inoue et al. | 521/54 |
| 5,114,479 | 5/1992 | Keaveney et al. | 106/30 R |
| 5,120,359 | 6/1992 | Uzukawa et al. | 106/20 A |
| 5,120,360 | 6/1992 | Tajiri . | |
| 5,124,400 | 6/1992 | Tirpak et al. | 524/591 |
| 5,160,369 | 11/1992 | Parkinson et al. | 106/19 R |
| 5,203,913 | 4/1993 | Yamamoto et al. | 106/22 B |
| 5,217,255 | 6/1993 | Lin et al. | 281/15.1 |
| 5,336,307 | 8/1994 | Horvat et al. | 106/19 B |
| 5,338,775 | 8/1994 | Matz et al. | 523/161 |
| 5,348,989 | 9/1994 | Shiraishi | 523/161 |

ERASABLE INK COMPOSITION CONTAINING A POLYMER-ENCAPSULATED COLORANT OBTAINED BY POLYMERIZING MONOMER IN THE PRESENCE OF SOLID COLORANT PARTICLES

This is a continuation of application Ser. No. 08/360,415 filed on Dec. 21, 1994 now abandoned.

BACKGROUND OF THE INVENTION

This invention relates to an erasable ink composition and to a marking instrument, e.g., a ball-point pen, containing the composition. More particularly, this invention relates to an erasable ink composition containing a dispersion of a polymer-encapsulated colorant.

Numerous erasable ink compositions are known, e.g., those described in U.S. Pat. Nos. 3,834,823, 3,875,105, 3,949,132, 4,097,290, 4,212,676, 4,227,930, 4,256,494, 4,297,260, 4,329,262, 4,329,264, 4,349,639, 4,357,431, 4,367,966, 4,368,076, 4,379,867, 4,389,499, 4,390,646, 4,391,927, 4,407,985, 4,410,643, 4,419,464, 4,441,928, 4,509,982, 4,525,216, 4,557,618, 4,578,117, 4,596,846, 4,606,769, 4,629,748, 4,687,791, 4,721,739, 4,738,725, 4,760,104, 4,786,198, 4,830,670, 4,954,174, 4,960,464, 5,004,763, 5,024,898, 5,037,702, 5,082,495, 5,114,479, 5,120,359, 5,160,369 and 5,217,255. These inks are formulated by mixing a colorant (taken herein to also include "pigment", "dye", "chromophore" and other terms of similar meaning) with a variety of polymer and liquid carrier/solvent combinations thereby forming a flowable colorant/polymer matrix. The polymer component is chosen for its film forming properties and its ability to be readily removed from the substrate to which it is applied, e.g., cellulosic paper, through the abrasive action of an eraser. However, a common problem with these erasable ink compositions concerns the residual colorant which remains after erasure. Incomplete erasure may be attributed to inadequate removal of the colorant/polymer matrix from the paper substrate and/or migration of colorant into the pores of the substrate.

SUMMARY OF THE INVENTION

In accordance with the present invention, an erasable ink composition is provided which comprises a dispersion of particles of water-insoluble polymer-encapsulated colorant obtained by polymerizing under emulsion polymerization conditions at least one emulsion-polymerizable monomer in the presence of solid colorant particles.

Since the solid colorant particles are encapsulated by polymer in the erasable ink composition of this invention, there is little opportunity for them to separate from the polymer and migrate into a porous substrate. Thus, the erasable ink composition of this invention is apt to leave significantly less residual colorant following its erasure than known erasable ink compositions in which the colorant is merely physically combined with the polymer component(s).

The term "polymer-encapsulated colorant" shall be understood herein to refer to any association of colorant and polymer in which colorant is physically bound or occluded by, or entrapped within, the polymer, e.g., as in the case where the polymer coats the surfaces of the colorant particles.

The term "colorant" shall be understood herein to include any water-insoluble, solid particulate color-imparting substance which is chemically inert with respect to both the monomer and the resulting encapsulating polymer.

DESCRIPTION OF THE PREFERRED EMBODIMENTS

The monomers employed in the practice of this invention include those of the hydrophobic and hydrophilic varieties. However, where hydrophilic monomers are employed, they must be copolymerized with a sufficient amount of hydrophobic monomer(s) and/or crosslinking monomer(s) as to provide a substantially water-insoluble polymer.

Examples of suitable hydrophobic monomers include monovinylidene aromatic monomers such as styrene, vinyl toluene, t-butyl styrene, chlorostyrene, vinylbenzyl chloride and vinyl pyridene; alkyl esters of $\alpha,\beta$-ethylenically unsaturated acids such as ethyl acrylate, methyl methacrylate, butyl acrylate and 2-ethylhexyl acrylate; unsaturated esters of saturated carboxylic acids such as vinyl acetate, unsaturated halides such as vinyl chloride and vinylidene chloride; unsaturated nitriles such as acrylonitrile; dienes such as butadiene and isoprene; and the like. Of these monomers, the monovinylidene aromatics such as styrene and the alkyl acrylates such as butyl acrylate are preferred.

Illustrative of useful water-soluble monomers are ethylenically unsaturated carboxylic acids or their salts such as acrylic acid, sodium acrylate, methacrylic acid, sodium methacrylate, itaconic acid and maleic acid; ethylenically unsaturated carboxamides such as acrylamide; vinyl pyrrolidone; hydroxyalkyl acrylates and methacrylates such as hydroxyethyl acrylate, hydroxypropyl acrylate and hydroxyethyl methacrylate; aminoalkyl esters of unsaturated acids such as 2-aminoethyl methacrylate; epoxy functional monomers such as glycidyl methacrylate; sulfoalkyl esters of unsaturated acids such as 2-sulfoethyl methacrylate; ethylenically unsaturated quaternary ammonium compounds such as vinylbenzyl trimethyl ammonium chloride; and, vinyl sulfonic acids or their salts such as styrene sulfonic acid and sodium vinyl sulfonate.

Suitable crosslinking monomers include ethylene dimethacrylate and divinylbenzene.

Particularly effective monomer recipes for the practice of this invention are those containing from about 20 to about 90 weight percent of styrene, from about 10 to about 80 weight percent of an alkyl acrylate such as butyl acrylate and from about 0.01 to about 2 weight percent of an unsaturated carboxylic acid such as acrylic acid, said weight percentages being based on the weight of total monomers.

Suitable colorants for use in preparing the polymer-encapsulated colorant component of the erasable ink composition herein include a wide variety of inorganic and organic pigments.

Useful inorganic pigments include C.I.(color index) Pigment Yellow-34, -36, -37, -42 and -48, C.I.Pigment Orange-21, C.I.Pigment Brown-6, C.I.Pigment Red-101, -105, -106, -107 and -108, C.I.Pigment Violet-14 and -16, C.I.Pigment Blue-27, -28, -29 and -35; C.I.Pigment Green-17, -18, -19 and -21, C.I.Pigment Black -6, -7, -9 and -10, C.I.Pigment White-1, -4 and -6, and the like.

Useful organic pigments include azo, anthraquinone, phthalocyanine, triphenylmethane, quinacridone and dioxazine pigments. Examples include C.I.(color index)Pigment Yellow-1, -2, -3, -5, -12, -13, -14, -15, -17 and -83, C.I.Vat Yellow-1, C.I.Pigment Orange-1, -5, -13, -16, -17 and -24, C.I.Vat Orange-3, C.I.Pigment Red -1, -2, -3, -4, -5, -7, -9, -12, -22, -23, -37, -38, -48 Calcium Lake, -49 Barium Lake, -50, -51, -53 Barium Lake, -57 Calcium Lake, -58 Manganese Lake, -60 Barium Lake, -63 Calcium Lake, -63 Manganese Lake, -81, -83 Aluminum Lake, -88, -112 and -214, C.I.Pigment Violet-1, -3, -19 and -23, C.I.Vat Violet-2, C.I.Pigment Blue-1, -2, -15, -16 and -17; C.I.Vat Blue-4, C.I.Pigment Green-2, -7, -8 and -10, C.I.Pigment Brown-1, -2 and 5, C.I.Vat Brown-3, C.I.Pigment Black-1, and the like.

Mixtures of two or more of these and/or similar colorants can be used to provide virtually any desired color by regulating the proportions of the individual colorants therein. It is preferred to use colorants having a particle size of not greater than about 5 microns and it is particularly preferred to employ colorants having a particle size of from about 0.01 to about 3 microns.

Those skilled in the art will recognize and appreciate that a wide variety of solid colorant particles can be employed in the practice of this invention, such colorants being included within the scope of this invention.

In the practice of this invention, an aqueous dispersion of colorant particles is first provided. The aqueous dispersion can be obtained employing any suitable method, e.g., that described in U.S. Pat. No. 3,884,871, the contents of which are incorporated by reference herein. Thus, the colorant particles can be dispersed in water with the aid of one or more dispersing agents. Suitable dispersing agents include surface active agents (surfactants) and emulsifiers, e.g., salts of fatty acids such as potassium oleate, metal alkyl sulfates such as sodium lauryl sulfate, salts of alkyl aryl sulfonic acids such as sodium dodecylbenzene sulfonate, polysoaps such as sodium polyacrylate and alkali metal salts of methyl methacrylate/2-sulfoethyl methacrylate copolymers and other sulfoalkyl acrylate copolymers, and other anionic surfactants such as the dihexyl ester of sodium sulfosuccinic acid; non-ionic surfactants such as the nonionic condensates of ethylene oxide with propylene oxide, ethylene glycol and/or propylene glycol; and cationic surfactants such as alkylamine-guanidine polyoxyethanols, as well as a wide variety of micelle generating substances described by D. C. Blackley in "Emulsion Polymerization", Wiley and Sons, Chapter 7 (1975) and other surfactants listed in McCutcheon's "Detergents and Emulsifers", 1980 Annual, North American Edition, McCutcheon, Inc., Morristown, N.J. Also included among the suitable surfactants are the surface active polymers (often called polysoaps), e.g., those described in U.S. Pat. No. 3,965,032, the contents of which are incorporated by reference herein. Of the suitable surfactants, the anionic varieties such as the potassium salts of functionalized oligomers, e.g., Polywet varieties available from Uniroyal Chemical, are preferred. Such surface active agents or emulsifiers are employed in amounts sufficient to provide a stable dispersion of the monomer and dye in water. Preferably, such surface active agents are employed in concentrations in the range from about 0.2 to about 10, most preferably from about 1 to about 6, weight percent based on the aqueous phase.

It is advantageous to use well-dispersed colorant particles to provide desirable conditions for the encapsulation of individual colorant particles with polymer. If the colorant particles are permitted to flocculate or agglomerate, they may become coated by the polymer to form relatively large encapsulated aggregates. While erasable inks containing such aggregates are not excluded from the scope of this invention, it will be understood by those skilled in the art that large amounts of these agglomerates could be disadvantageous for some applications.

Good colorant dispersions in water can be obtained by first preparing a concentrated aqueous colorant slurry containing about 60–70 weight percent or more of colorant, adding a dispersing agent to the slurry and thoroughly mixing the resulting dispersion. If desired, the colorant particles can be wetted or coated with monomer(s) and/or copolymerizable anchoring agent(s) prior to forming the dispersion. If desired, the concentrated dispersion of colorant may thereafter be diluted, e.g., to a concentration of between 15 and 30 percent of colorant by weight, by addition of deionized water. Small amounts of additional dispersing agent can be added if desired.

The use of a copolymerizable anchoring agent can be advantageous in promoting the anchoring of the encapsulating polymer to the surfaces of the colorant particles during polymerization and insuring that all of the colorant particles are uniformly coated by the polymer. Suitable anchoring agents include organic vinyl monomers containing polar groups which are strongly adsorbed on the surfaces of the colorant particles. Representative polar groups include, e.g., —COOH, —SO$_3$H, —NH$_2$, —OH, —CONH—, —C≡N, —CO—, —COO— and NO$_2$. Examples of useful anchoring agents include the acrylic and methacrylic acids and their sodium salts, hydroxyethylmethacrylate, aminoacrylates and sodium vinylsulfonate. These and similar anchoring agents will undergo copolymerization with the emulsion polymerizable monomers and thus become incorporated into the structure of the encapsulating polymer.

The emulsion polymerization conditions employed in the practice of this invention are generally conventional free-radical type polymerizations carried out in the presence of a radical initiator such as a peroxygen compound, an azo catalyst, ultraviolet light and the like. Preferably, such polymerization is carried out in the presence of a water-soluble peroxygen compound at temperatures in the range from about 50° to about 90° C. The emulsified colorant/monomer polymer-forming reaction medium is generally agitated during polymerization in order to maintain adequate feed transfer. The concentration of catalyst can range of from about 0.005 to about 8, and preferably from about 0.01 to about 5, weight percent based on total monomer. Examples of suitable catalysts include inorganic persulfate compounds such as sodium persulfate, potassium persulfate, ammonium persulfate; peroxides such as hydrogen peroxide, t-butyl hydroperoxide, dibenzoyl peroxide and dilauroyl peroxide; azo catalysts such as azobisisobutyronitrile, and other common free-radical generating compounds. Also suitable are various forms of free-radical generating radiation means such as ultra-violet radiation, electron beam radiation and gamma radiation. Alternatively, a redox catalyst composition can be employed wherein the polymerization temperature ranges from about 25° to about 80° C. Exemplary redox catalyst compositions include a peroxygen compound as described hereinbefore, preferably potassium persulfate or t-butyl hydroperoxide, and a reducing component such as sodium metabisulfite and sodium formaldehyde hydrosulfite. It is also suitable to employ various chain transfer agents such as mercaptans, e.g., dodecyl mercaptan, dialkyl xanthogen disulfides, diaryl disulfides, and the like.

Following emulsion polymerization, the emulsion polymerizate can be withdrawn from the polymerization vessel and (1) the emulsion employed as, or in, the erasable ink or (2) the unreacted monomer and other volatiles can be removed to provide a concentrated emulsion which is then used as, or in, the erasable ink or (3) the polymer-encapsulated colorant particles can be recovered from the aqueous continuous phase of the dispersion by conventional means such as drying under vacuum or spray drying and, following any optional post-recovery operation such as washing, redispersed in an appropriate dispersion medium to provide the erasable ink.

The polymer-encapsulated colorant particles of the erasable ink composition of this invention will generally possess an average particle size of from about 25 to about 1000 nanometers and preferably from about 50 to about 250 nanometers. The fully formulated erasable ink composition, i.e., the dispersion of polymer-encapsulated colorant and any optional component(s), can possess a relatively low viscosity, e.g., from about 1 to about 80,000 centipoises and preferably from about 3 to about 30,000 centipoises, or a relatively high viscosity, e.g., at least about 100,000 centipoises and preferably at least about 500,000 centipoises. It will, of course, be recognized that when the erasable ink composition possesses such a high viscosity that it no longer readily flows solely under the influence of gravity, it becomes necessary to provide a pressurized delivery system for any marking instrument containing the ink.

To improve or optimize one or more functional characteristics of the erasable ink composition, one or more optional components can be added in the usual amounts to the composition, e.g., one or more natural and/or synthetic polymer latices, rheological modifiers, dispersing agents, humectants, emulsifiers, surfactants, plasticizers, spreading agents, drying agents, release agents, parting agents, preservatives, antimicrobial agents, anticorrosion agents, antioxidants, coalescing aids, anchoring agents and the like.

With or without the addition of any optional component(s), the erasable ink composition when applied to a substrate, and particularly a porous substrate such as a cellulosic paper, and upon drying thereon must be (1) sufficiently adherent to the substrate as to resist flaking therefrom and (2) substantially erasable. Thus, the dry erasable ink composition of this invention applied to paper and evaluated by the adherency test described infra will generally exhibit less than about 30 weight percent flaking, preferably less than about 20 weight percent flaking and even more preferably less than about 10 weight percent flaking. Erasability values delta E*ab of the erasable ink composition herein as measured by ASTM D-2244-89 will generally be on the order of less than about 4.0, preferably less than about 3.5 and even more preferably less than about 3.0.

It is preferred that the erasable ink composition herein when evaluated by the smearability test described infra exhibit a subjectively determined low level of smear, e.g., a smear value of 2 or less and preferably a smear value of 1 (i.e., essentially no smearing).

The erasable ink composition of this invention is intended to be used in any of a variety of marking instruments, and in particular, a ball-point pen.

The following examples are illustrative of the erasable ink composition of this invention.

EXAMPLES ILLUSTRATING THE PREPARATION OF POLYMER-ENCAPSULATED COLORANT

Example 1

The following ingredients were placed in a reaction bottle and stirred:

| Ingredient | Amount (g) |
|---|---|
| Water | 56.00 |
| Rosin Soap | 2.00 |
| $Na_3PO_4 \cdot 10H_2O$ | 0.17 |
| HEMA (Fe(II) complex of EDTA from Hampshire) | 0.02 |
| Sodium formaldehyde sulfoxyl | 0.03 |
| Dispersed Blue 69 (copper phthalocyanine from BASF) | 4.00 |

Thereafter, the following ingredients were placed in the reaction bottle containing the above-identified ingredients and the bottle was capped:

| Ingredient | Amount (g) |
|---|---|
| Styrene | 9.00 |
| Dodecyl mercaptan | 0.07 |
| Butadiene (liquified) | 25.00 |

A solution of cumene hydroperoxide (0.03 g) in styrene (1.00 g) was then added to the reaction bottle via syringe. The reaction bottle was agitated for about 12 to about 24 hours at approximately 15° C. to provide an emulsion polymerizate containing approximately 42.4 weight percent solids. The color of the resulting polymer-encapsulated colorant (dry) was blue. The average particle size (dry) of the polymer-encapsulated colorant was about 100 to about 300 nanometers. The calculated $T_g$ for the polymer-encapsulated colorant was approximately −46° C.

Example 2

A mini-emulsion was formed by mixing the following ingredients together and passing the mixture through a microfluidizer several times:

| Ingredient | Amount (g) |
|---|---|
| Water | 78.88 |
| Styrene | 15.69 |
| Sodium lauryl sulfate | 0.80 |
| Hexadecane | 2.52 |
| TINT-AYD Blue PC (copper phthalocyanine from Daniels Products) | 2.10 |

Thereafter, the following ingredients were placed in a reaction bottle and the bottle was capped:

| Ingredient | Amount (g) |
|---|---|
| Mini-emulsion (described above) | 46.54 |
| Water | 37.50 |
| Dodecyl mercaptan | 0.07 |
| $Na_3PO_4 \cdot 10H_2O$ | 0.17 |
| HEMA (FE(II) Complex of EDTA from Hampshire) | 0.02 |
| Sodium formaldehyde sulfoxyl | 0.03 |
| Butadiene (liquified) | 25.00 |

A solution of cumene hydroperoxide (0.03 g) in styrene (1.00 g) was then added to the reaction bottle via syringe. The reaction bottle was agitated for about 12 to about 24 hours at approximately 15° C. to provide an emulsion polymerizate containing approximately 32.3 weight percent solids. The color of the resulting polymer-encapsulated colorant (dry) was blue. The average particle size (dry) of the polymer-encapsulated colorant was about 100 to about 300 nanometers. The calculated $T_g$ for the polymer-encapsulated colorant was approximately −53° C.

Example 3

The following ingredients were placed in a reaction kettle and stirred at approximately 60° C.:

| Ingredient | Amount (g) |
| --- | --- |
| Water | 238.0 |
| Alipal EP-120 (Anionic Surfactant from Rhône-Poulenc) | 9.7 |
| Sipo DS-4 (Anionic Surfactant from Rhône-Poulenc) | 9.7 |
| Aquis Phthalo Blue Pigment R/S BW-3521 (Heubach) | 20.0 |

A pre-emulsion was formed by stirring the following ingredients together in a separate container at room temperature for 30 minutes:

| Ingredient | Amount (g) |
| --- | --- |
| Water | 190.0 |
| Alipal EP-120 (Anionic surfactant from Rhône-Poulenc) | 29.6 |
| Sipo DS-4 (Anionic surfactant from Rhône-Poulenc) | 9.7 |
| Butyl acrylate | 162.0 |
| 2-Ethyl hexyl acrylate | 162.0 |
| Acrylonitrile | 42.0 |

The pre-emulsion (30 g) was added to the reaction kettle at about 75° C. and stirred for approximately 15 minutes. A solution of azo initiator (VA-61 from WAKO Chemicals) (0.03 g) in water (6.1 g) was added to the reaction kettle to initiate emulsion polymerization. The contents of the reaction kettle were stirred for approximately 15 minutes at about 60° C. The remaining portion of the pre-emulsion was introduced to an addition funnel and added dropwise to the reaction kettle over a 3 hour period at about 75° C. Similarly, an initiator solution formed by admixing water (48.3 g), Alipal EP-120 (anionic surfactant from Rhône-Poulenc) (1.9 g) and azo initiator (VA-61 from WAKO Chemicals) (0.5 g) was then placed in the addition funnel and added dropwise to the reaction kettle over the three hour period while maintaining the reaction kettle at about 75° C. After all additions were complete, the temperature of the reaction kettle was maintained at 80° C. for approximately 1 hour. Thereafter, residual monomer remaining in the emulsion polymerizate was scavenged with four separate scavenger solutions of sodium formaldehyde sulfoxylate (Hydro AWC from Henkel) (0.15 g) in water (10 g) and a 70% solution of t-butylhydroperoxide (0.30 g) in water (5 g). The resulting emulsion polymerizate was neutralized to a slightly basic pH, i.e., from about 7.5 to about 8.5, utilizing Aqua Ammonia 28%. The color of the resulting polymer dye (dry) was blue. The average particle size of the polymer dye was about 120 nanometers. The calculated $T_g$ for the polymer dye was approximately −61° C.

Example 4

The following ingredients were placed in a reaction kettle and stirred at approximately 60° C.:

| Ingredient | Amount (g) |
| --- | --- |
| Water | 273.3 |
| Alipal EP-120 (Anionic Surfactant from Rhône-Poulenc) | 4.0 |
| Sipo DS-4 (Anionic Surfactant from Rhône-Poulenc) | 4.0 |
| Iron sulfate (0.025M) | 1.5 |
| Aquis Phthalo Blue Pigment R/S BW-3521 (Heubach) | 20.0 |

A pre-emulsion was formed by admixing the following ingredients under stirring for 30 minutes at room temperature:

| Ingredient | Amount (g) |
| --- | --- |
| Water | 213.7 |
| Alipal EP-120 (Amine Surfactant from Rhône-Poulenc) | 9.7 |
| Sipo DS-4 (Anionic Surfactant from Rhône-Poulenc) | 3.4 |
| Acrylic acid | 3.4 |
| Itaconic acid | 3.4 |
| Butyl acrylate | 190.2 |
| 2-Ethylhexylacrylate | 190.2 |
| Acrylonitrile | 50.0 |

The pre-emulsion (30 g) was added to the reaction kettle at about 60° C. and stirred for approximately 15 minutes. A solution of ammonium persulfate (0.5 g) in water (6.2 g) and a solution of sodium bisulfate (0.3 g) in water (6.2 g) were added to the reaction kettle to initiate emulsion polymerization. The contents of the reaction kettle were stirred for approximately 15 minutes at about 60° C. An initiator solution formed by admixing water (49.8 g), Alipal EP-120 (anionic surfactant from Rhône-Poulenc) (2.2 g) and ammonium persulfate (0.8 g) and an initiator solution formed by admixing water (49.8 g) and sodium bisulfate (0.4 g) were then placed in an addition funnel and added dropwise to the reaction kettle over a three hour period while maintaining the kettle at about 80° C. Similarly, the remaining portion of the pre-emulsion was introduced to an addition funnel and added dropwise to the reaction kettle over the 3 hour period while maintaining the temperature of the reaction kettle at 80° C. After all additions were complete, the temperature of the reaction kettle was maintained at 80° C. for approximately 1 hour. Thereafter, residual monomer remaining in the emulsion polymerizate was scavenged with four separate scavenger solutions of sodium formaldehyde sulfoxylate (Hydro AWC from Henkel) (0.15 g) in water (10 g) and a 70% solution of t-butylhydroperoxide (0.30 g) in water (5 g). The resulting emulsion polymerizate was neutralized to a slightly basic pH, i.e., from about 7.5 to about 8.5, utilizing Aqua Ammonia 28%. The color of the resulting polymer-encapsulated colorant (dry) was blue. The calculated $T_g$ for the polymer-encapsulated colorant was approximately −50° C.

The polymer-encapsulated colorants of Examples 1–4 can be directly employed as erasable ink compositions or be combined with one or more optional components as disclosed hereinabove prior to being employed as erasable ink compositions.

The properties of the erasable ink composition of Example 2 were evaluated. In particular, the color intensity, viscosity, adherency, erasability and smearability of the erasable ink composition were evaluated.

Color intensity was evaluated by a subjective visual evaluation of script.

Adherency was determined by performing a drawdown on preweighed Linetta drawdown paper with approximately 0.8 g of sample (spread over an area of ¼ inch×1½ inch) and drawn down with a #6 cater-bar. The sample was allowed to dry completely (approximately 5 minutes at room temperature) and the paper was weighed again. The paper was then crumpled by hand, any flakes were blown off and the paper was reweighed. This test was also performed with erasable ink made according to U.S. Pat. Nos. 5,120,359 and 5,203,913 (Comparative Example 1).

Erasability was determined by performing an actual "WRITE-TEST" (similar to a spirograph wherein ink is applied in a circular arrangement on paper with some cross-over of ink occurring) with ball-point pens containing the erasable ink composition of Example 2 and the following commercially available pens which contain erasable ink:

| Pen | Ink Color | Comparative Example |
| --- | --- | --- |
| Erasermate | Blue | 2 |
| Erasermate 2 | Blue | 3 |
| Scripto | Blue | 4 |
| Scripto | Red | 5 |

The "WRITE-TEST" write-downs were then erased and reflectance measurements were performed on the erased portion of the paper versus an unblemished/untouched portion of the paper. A quantitative value was then obtained, i.e., delta E*ab from CIE lab measurement (described in ASTM D-2244-89). Lower values indicate more complete erasures.

Smearability was subjectively evaluated for the erasable ink composition of Example 2 and Comparative Examples 2–5 1–2 seconds after writing by attempting to smudge the ink with one's fingers. A smear value of 1 represents essentially no smearing and a smear value of 5 represents such a degree of smearing that legibility of the writing is significantly impaired.

Table I below presents the properties of the erasable ink compositions:

TABLE I

| Example | Color Intensity | Viscosity (cps) | Adherency (Wt. % of Dried Ink Composition Retained on the Paper) | Erasability Value (delta E*ab) | Smear Value |
| --- | --- | --- | --- | --- | --- |
| 3 | Approx. 50% of Comparative Examples | ~3–10 | 100% | 1.55 | 1 |
| Comp. Ex. 1 | — | — | 63% | — | — |
| Comp. Ex. 2 | — | — | — | 3.3 | 2 |
| Comp. Ex. 3 | — | — | — | 3.63 | 2 |
| Comp. Ex. 4 | — | — | — | 5.38 | 3 |
| Comp. Ex. 5 | — | — | — | — | 4 |

As can be seen from the data presented in Table I, the erasable ink composition of Example 2 exhibited superior adherency, erasability and resistance to smear relative to the comparative examples. The erasable ink composition of this invention is highly adherent to substrates as to resist flaking therefrom, substantially erasable and substantially non-smearing.

While this invention has been disclosed herein in connection with certain embodiments and certain procedural details, it is clear that changes, modifications or equivalents can be used by those skilled in the art. Accordingly, such changes within the principles of this invention are intended to be included within the scope of the claims below.

What is claimed is:

1. An erasable ink composition which, prior to being applied to a substrate, comprises an aqueous dispersion of particles of water-insoluble polymer-encapsulated colorant obtained by polymerizing under emulsion polymerization conditions at least one emulsion-polymerizable monomer in the presence of solid colorant particles, the erasable ink composition when applied to a substrate and upon driving thereon exhibiting less than about 30 weight percent flaking based on the weight of the dried ink and an erasability value delta E*ab of less than about 4.0.

2. The erasable ink composition of claim 1 exhibiting less than about 20 weight percent flaking based on the weight of the dried ink and an erasability value delta E*ab of less than about 3.5.

3. The erasable ink composition of claim 1 exhibiting less than about 10 weight percent flaking based on the weight of the dried ink and an erasability value delta E*ab of less than about 3.0.

4. The erasable ink composition of claim 1 wherein the composition possesses a viscosity of from about 1 to about 80,000 centipoises.

5. The erasable ink composition of claim 1 wherein the composition possesses a viscosity of from about 3 to about 30,000 centipoises.

6. The erasable ink of claim 1 wherein the water-insoluble polymer-encapsulated colorant possesses an average particle size of from about 25 to about 1000 nanometers.

7. The erasable ink of claim 1 wherein the water-insoluble polymer-encapsulated colorant possesses an average particle size of from about 50 to about 250 nanometers.

8. The erasable ink composition of claim 1 wherein the monomer is selected from the group consisting of styrene, vinyl toluene, t-butyl styrene, chlorostyrene, vinyl benzyl chloride, vinyl pyridene, ethyl acrylate, methyl methacrylate, butyl acrylate, 2-ethylhexyl acrylate, vinyl acetate, vinyl chloride, vinylidene chloride, acrylonitrile, butadiene and isoprene.

9. The erasable ink composition of claim 1 wherein the solid colorant particles are wetted with copolymerizable monomer prior to contact with the emulsion-polymerizable monomer.

10. The erasable ink composition of claim 9 wherein the solid colorant particles are wetted with copolymerizable monomer prior to contact with the emulsion-polymerizable monomer.

11. The erasable ink composition of claim 10 wherein the solid colorant particles are wetted with copolymerizable monomer selected from the group consisting of styrene, vinyl toluene, t-butyl styrene, chlorostyrene, vinyl benzyl chloride, vinyl pyridene, ethyl acrylate, methyl methacrylate, butyl acrylate, 2-ethylhexyl acrylate, vinyl acetate, vinyl chloride, vinylidene chloride, acrylonitrile, butadiene and isoprene.

12. The erasable ink composition of claim 1 wherein the colorant particles are present in aqueous dispersion prior to contact with the emulsion-polymerizable monomer.

13. The erasable ink composition of claim 1 wherein the colorant particles are wetted with copolymerizable monomer containing polar groups.

14. The erasable ink composition of claim 13 wherein the copolymerizable monomer contains one or more groups selected from the group consisting of —COOH, —SO$_3$H, —NH$_2$, —OH, —CONH$_2$, —C≡N, —CO—, —COO— and —NO$_2$.

15. The erasable ink composition of claim 14 wherein the copolymerizable monomer is selected from the group consisting of acrylic acid, sodium acrylate, methacrylic acid, sodium methacrylate, aminoacrylate and sodium vinylsulfonate.

16. The erasable ink composition of claim 1 further comprising at least one component selected from the group consisting of natural latices, synthetic latices, rheological modifiers, dispersing agents, humectants, emulsifiers, surfactants, plasticizers, spreading agents, drying agents, release agents, parting agents, preservatives, antimicrobial agents, anticorrosion agents, antioxidants, coalescing aids and anchoring agents.

17. A marking instrument containing the erasable ink composition of claim 1.

18. The marking instrument of claim 17 which is a ball-point pen.

* * * * *